C. RENAUX.
LOCKING MECHANISM AND THE LIKE.
APPLICATION FILED JULY 30, 1914.
1,234,212.
Patented July 24, 1917.
2 SHEETS—SHEET 1.
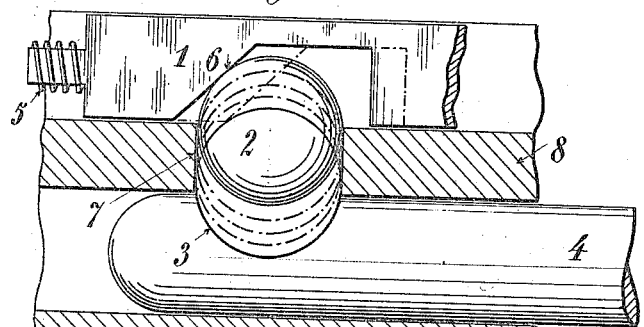
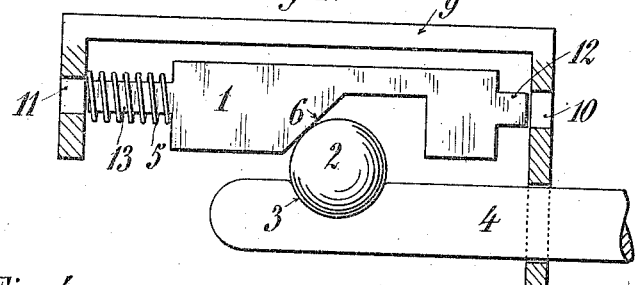
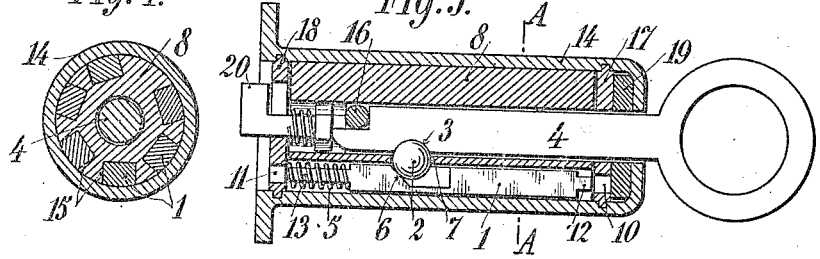
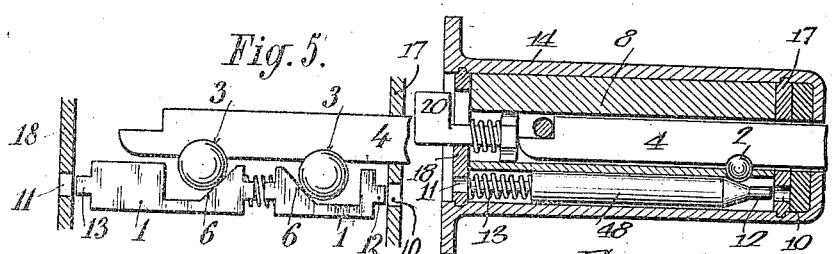
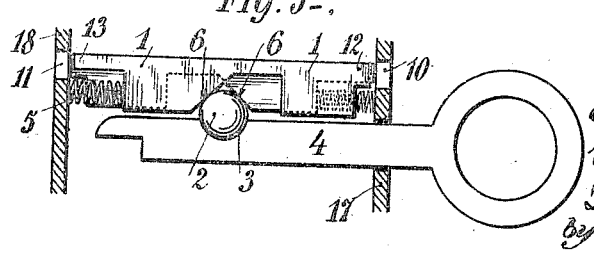
Inventor:
Charles Renaux C. RENAUX.
LOCKING MECHANISM AND THE LIKE.
APPLICATION FILED JULY 30, 1914.
1,234,212.
Patented July 24, 1917.
2 SHEETS—SHEET 2.
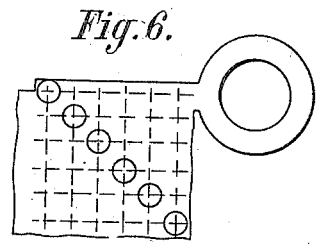
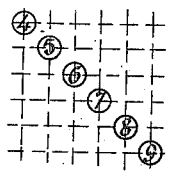
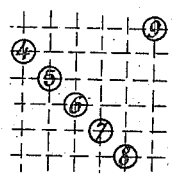
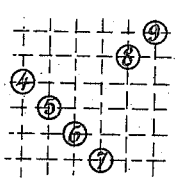
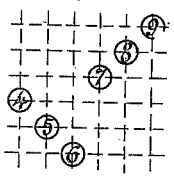
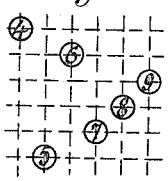
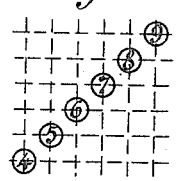
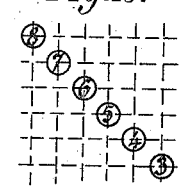
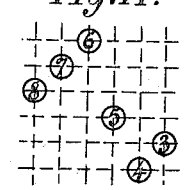
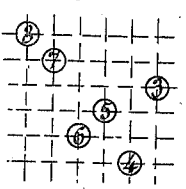
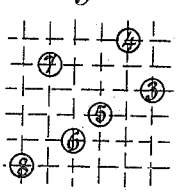
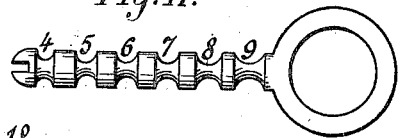
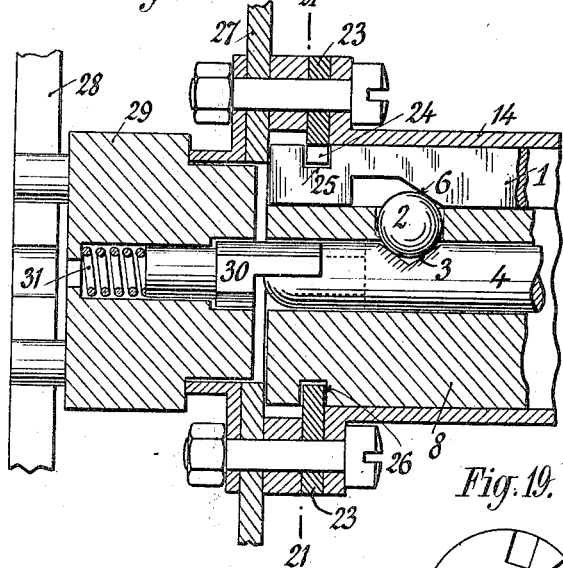
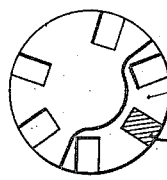
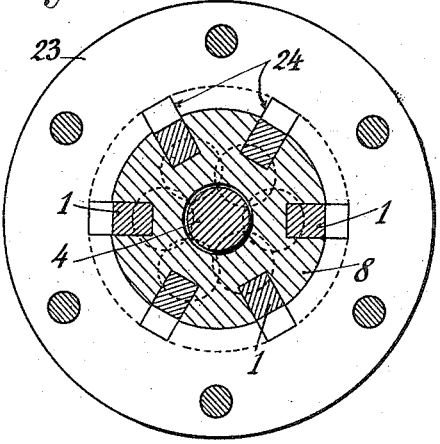
Inventor:
Charles Renaux.

UNITED STATES PATENT OFFICE.

CHARLES RENAUX, OF PARIS, FRANCE.

LOCKING MECHANISM AND THE LIKE.

1,234,212.  Specification of Letters Patent.  Patented July 24, 1917.

Application filed July 30, 1914.  Serial No. 854,114.

*To all whom it may concern:*

Be it known that I, CHARLES RENAUX, a citizen of the French Republic, residing at Paris, France, have invented certain new and useful Improvements in Locking Mechanisms and the like, of which the following is a specification.

This invention relates to locks of the rotating barrel type, and consists in arranging in the barrel a number of longitudinally sliding bolts adapted to lock at either end and provided with inclined surfaces adapted to be engaged by radially sliding adjusting balls. The key is provided with recesses of such a depth that all the adjusting balls are held in position to maintain the bolts in the unlocked position.

Owing to the use of longitudinally sliding bolts it is possible to reduce the dimensions of the lock very materially, as compared with existing locks, without any sacrifice of strength or safety, while a very large number of different combinations can be obtained, since the longitudinal and angular positions of the balls, and the distances through which they must be raised, can all be varied.

Several constructions according to this invention are illustrated in the accompanying drawings in which—

Figures 1 and 2 show diagrammatically, in longitudinal elevation, on an enlarged scale, the chief elements of the invention.

Fig. 3 is a longitudinal section of a construction of a safety barrel according to this invention.

Fig. 4 is a cross-section on line A—A of Fig. 3.

Figs. 5 and 5ª show in partial longitudinal sections two modified constructions of the invention.

Figs. 6–16 show diagrams of combinations that can be obtained with this device.

Figs. 17 and 18 show two modified constructions of keys.

Fig. 19 shows a construction of one of the locking washers in a multiple key lock.

Fig. 20 is a longitudinal section through a modified construction in which the elements operated are combined with an inner safety washer.

Fig. 21 is a cross-section on the line 21—21 of Fig. 20.

Fig. 22 shows the bolts in longitudinal section as applied to a rotating barrel similar to that shown in Fig. 3.

The large scale diagram of Fig. 1 shows the relative positions assumed respectively by a locking bolt 1 and a ball 2 in various combinations which are determined by the different positions that the ball assumes in holes 3 of different depth provided in the key 4. In the position of rest, that is to say, when the key has been withdrawn from the bore a spring 5 moves the bolt 1, so that the ball is forced by the inclined planes or cam faces 6 to penetrate into the radial hole 7 of the core 8, which forms its seating. The introduction of the key 4 into the bore of the core 8, pushes aside the ball 2 which at first moves the bolt 1 longitudinally to an extent proportional to the total height of the operative projecting portion of the ball 2, and then allows the bolt 1 to return under the action of the spring 5, to an extent corresponding to the depth of the recess 3 provided in the stem of the key 4. This depth is, however, smaller than the projecting operative portion of the ball. The difference between the movement of the bolt 1 in one direction under the action of the ball, and its return in the opposite direction under the action of the spring, gives the exact extent of the travel which the said bolt 1 must make in the longitudinal direction, in order to be brought to the unlocking position, that is to say, to the position in which the mechanism to be operated, is unlocked.

This travel can be increased or reduced relatively to the movement of the ball 2, by inclining the cam face 6 of the bolt 1, to a larger or smaller angle than 45°.

In the position of rest, corresponding to the locking position of the bolts 1, the latter engage, with one of their ends, a hole provided in a fixed part constituting for instance one of the walls of the surrounding part or casing of the device. This device may consist of a shackle 9, Fig. 2, the arms of which have openings 10 and 11 with which may engage either one or the other of the ends of bolt 1, the length of which exactly corresponds to the space between the said arms. The key 4 has a recess 3, which when the key is inserted completely into the bore which serves as its guide is directly opposite to ball 2. This recess has such a depth that ball 2 acts on the inclined planes 6, so as to displace bolt 1 longitudinally in opposition to the action of spring 5 by the quantity desired, so that the ends of its tenons 12, 13 are located entirely in the interior of the shackle 9. If the recess is smaller than it should be, the ball 2 will push bolt 1 to the left so that its tenon 13 enters into hole 11 of the shackle, there resulting therefrom a locking position which will prevent any revolving movement of the bolt about the axis of the key relative to the bolt 1. On the contrary if the recess is too large, the ball 2 entering into this recess does not sufficiently push the bolt 1 so that the tenon 12 remains in engagement with the hole 10, thus obtaining the same locking condition as before.

Figs. 3 and 4 show the device arranged in a safety barrel 14 secured to the plate of a lock or any other suitable closing mechanism. In this construction, the locking bolts 1 are guided in longitudinal grooves 15 on the cylindrical core 8 which must be rotated for operating the mechanism to which the device is applied. The driving of the core carrying the bolts, by means of the key, can be effected in various ways, for instance by a pin 16 introduced transversely into the core 8, against which a tenon rests formed at the end of the key.

When the key is completely inserted into the central bore of the core, the said core cannot be rotated unless the notches of the key correspond with the combination. Otherwise there will be locking (either in front or at the back) in the disks 17 and 18 which are secured to the fixed barrel and limit the recess for the core at each of its ends.

A hardened steel washer 19 protects the front end of the core 8 against drilling, cutting or other tampering.

By introducing the key completely, an intermediate part is projected, such as a spring-controlled member 20 secured to the core 8 and operating the bolt of the lock by the rotation of the said core.

The grooves 15 in which the bolts 1 are mounted, are not equidistant, which makes it necessary to give the key a complete turn in order to enable it to be withdrawn. In fact, it is necessary that the ends of the bolts 1 should all register well with the holes of the rear disk 18 of the barrel for withdrawing the key, for at that moment the balls 2, becoming disengaged from the notches of the key, allow the bolts to engage with the said holes. By suitably arranging the grooves 15, it will be possible to withdraw the key at the desired fraction of a turn, according to requirements.

The guide grooves 15 can be of any desired number and dimensions, and the bolts 1 can be drawn, milled or cut. The core 8 can be obtained by drawing or molding, and it can be provided with recesses or seatings for different or similar sized balls. Moreover, the outer barrel can be stamped out.

It follows from the foregoing that while enabling devices of perfect safety to be constructed in the shape of barrels of reduced dimensions, this invention renders it possible to carry out the manufacture in a very economical manner. With correct parts, and without necessitating adjustments, it will be possible to manufacture these safety barrels with an accuracy approaching 0.05 of a millimeter.

The working parts are not liable to wear. The machining of the notches of the key is effected by drilling, the combinations being obtained by varying the position and the depth of the cells in the key.

The number of possible combinations or arrangements of the balls and the number of positions that each ball can occupy relatively to the key (this position being determined by the depth of the notches in the key) is given by an algebraic formula used in combination calculations.

Fig. 6 shows the development of the key with 6 balls 4 mm. in diameter, each adapted to occupy eleven different positions. By varying the positions of the holes, their distance apart, diameter of the balls, and relative angle of the bolts, infinite combinations will be obtained. This device can be made with a diameter of about 14 mm. with balls of 4 mm., a key of 4 mm., weighing 4 gr. and five bolts having a section of about 3 mm. x 4 mm., and having cylindrical locking ends of a diameter of 2.6 mm., or a section of 5.3 sq. mm., thus a total section of nearly 30 sq. mm., will be obtained for the locking. Therefore it may be maintained that this system is much stronger than any known devices: with blades, fittings, stop pins, etc., although it is exceedingly small, since with this system it is possible to construct safety devices only 8-10 mm. in diameter, without sacrificing safety or strength.

These barrels can be provided with three, four, five, six or more bolts, and it is possible to make a master key that would open all the individual locks.

The keys could be flat, polygonal or elongated of any shape, but are preferably round.

In the construction shown in Fig. 5, each groove of the core 8 is provided with two bolts arranged in line and controlled by one and the same spring having the tendency to move them in opposite directions. Each bolt is operated by one ball, so that each groove contains two balls for the key and two similar or different notches.

As shown in the modified construction in Fig. 5ᵃ, a single ball could also be used with two bars engaging it, and provided with inclined planes of opposite direction. In this case, the two bars intersect each other longitudinally in the same groove, and work simultaneously for locking in front and at the back of the core simultaneously. This arrangement (Fig. 5ª) renders it unnecessary to use a protecting washer 19 of hardened steel as any attempt at tampering that may affect the locking part of the front bolts, will leave the rear bolts intact.

The locks are preferably made in series, each series having a master-key. One such arrangement is shown in Figs. 6–12, in which the circles represent the positions of the recesses on the developed surface of the key, and in which the numbers 4, 5, 6, 7, 8, 9 represent the depths of the said recesses. It will be seen that in all the keys the longitudinal spacing and the order of the depth of the recesses remain constant, but that their angular arrangement is in each case different. Thus each key will only operate a lock in which the balls are arranged similarly, but all the locks of the series will be operable by the key shown in Fig. 17, in which are annular grooves corresponding in longitudinal position and depth to the recesses on any of the keys shown in Figs. 7–12. This master key however will only serve for locks of this particular series, and will be useless in locks of any other series in which either the longitudinal spacing or the order of depth, or both, are different.

Figs. 13–16 show another arrangement in which a number of recesses, in this case those numbered 7 and 5, retain their angular position throughout the series. The master-key for this series has recesses 7 and 5 corresponding in position to those on the individual keys, instead of annular grooves as in the key shown in Fig. 17.

By the arrangement shown in Fig. 19 it is possible to operate two door-bolts from the same lock, whereby one key—the servants' key—can operate only one bolt, while the other—the users' key—can operate both.

In this modification, the barrel operates the latch-bolt by a half-turn or less, but the locking bolt can only be operated by a complete turn. The locking plate shown in Fig. 19 has an arcuate depression 21 on its inner side. The users' key has holes which adjust all the bolts 1 to clear the un-recessed surface of the locking plate, so that the barrel can turn freely through a complete revolution, and can therefore operate both door-bolts.

The servants' key, however, has one of its holes missing or of an incorrect depth, so that the corresponding bolt 22 (Fig. 19) is adjusted to clear the depression 21, but not the un-recessed surface of the plate. Consequently the servants' key can only turn the barrel through a fraction of a turn corresponding to the extent of the arcuate depression 21. Therefore, if the door has been locked only with the latch-bolt, the servants' key can unlock the door, whereas if the locking bolt has been operated as well as the latch-bolt, the servants' key is useless since it cannot turn the barrel through a complete revolution.

In the construction shown in Figs. 20 and 21 the casing 14 comprises only a locking washer 23 arranged between the shoulder of the said barrel and the box 27 of the lock in which the said barrel is mounted. The washer 23 is provided with notches 24 in which the locking bolts 1 engage one of the recesses, the locking bolt being also provided with such a recess. If the ball 2 is displaced to the correct extent, the notch 25 comes in the plane of the washer 23 and the core 8 can then rotate. If the balls 2 are not brought in the correct position, the notches 25 of the locking bolts 1 do not register with the notches 24 of the washer 23, so that the said locking bolts 1 remain engaged in the said notches and prevent the core 8 from rotating.

The edges of the said washer 23 comprised between each recess 24 engage a groove 26 of the cylindrical core 8, so that the latter is prevented from longitudinally moving while the core rotates. If the lock were tampered with and the front of the barrel 14 cut out, the above arrangement would prevent the core locking mechanism from being taken out. The latch or bolt 28 of the lock is operated by means of a crank disk 29 provided with two pins; this disk is connected to the core 8 by a spring-controlled plunger 30 (spring 31) engaging the disk 29 when the key 7 is pushed home. To that end, the plunger is polygonal and fits polygonal surfaces, one of which is in the core 8 and the other in the disk 29.

When the key is withdrawn, the outer polygonal face of the plunger 30 is disengaged from the polygonal face of the disk under the action of the spring 31, so that the plunger 30 engaging the disk 29 only with its cylindrical end can freely rotate without driving the said disk.

The combinations of this device are unlimited on account of the great variation in drilling that can be obtained.

In this device when one employs a master key, all the locking parts remain active, whatever the combination adopted may be, so that the security remains complete, contrary to the other known safety devices with master keys in which the inactive locking devices are removed, so that the security is decreased. In fact in the device of this patent application the grooves of the master key comprise all the recesses of the same depth corresponding to the different keys of the locks of the same category, the combination of which remains identical. The master key with grooves shown in Fig. 18 besides being able to open the doors, the locks of which reach a certain thickness, can open the locks of the furniture in the different rooms to which these doors give access. For this purpose the master key has a reduced end corresponding to the thickness of the lock and other grooves in this end which are intended to serve only to operate the small interior locks and which has no influence on the operation of the principal door lock.

What I claim as my invention and desire to secure by Letters Patent is:—

1. A lock comprising in combination, a rotary barrel having a longitudinal keyhole, spring-pressed bolts longitudinally sliding in said barrel and adapted to lock the barrel at either end, inclined surfaces on said bolts, radially-sliding-balls adapted to engage said inclined surfaces and move the bolts longitudinally, and a key having depressions adapted to hold said balls in position to maintain the bolts in the unlocked position.

2. A lock comprising in combination a rotary barrel having a central cylindrical key hole, spring-pressed bolts longitudinally sliding in grooves in the outer surface of the barrel and adapted to lock the barrel at either end inclined surfaces on said bolts, balls sliding in radial slots extending between the grooves and the key-hole and adapted to engage said inclined surfaces and move the bolts longitudinally, and a key having depressions adapted to hold said balls in position to maintain the bolts in the unlocked position.

3. A lock comprising in combination a rotary barrel having a central cylindrical key-hole and a plurality of longitudinal grooves in its outer surface, a pair of spring-pressed bolts longitudinally sliding in each of said grooves and having opposed inclined surfaces, radially-sliding balls adapted to engage said inclined surfaces and move the bolts longitudinally, and a key having depressions adapted to hold said balls in position to maintain the bolts in the unlocked position.

4. A lock comprising in combination a rotary barrel having a longitudinal keyhole, spring-pressed bolts longitudinally sliding in said barrel and adapted to lock the barrel at either end, inclined surfaces on said bolts, radially-sliding balls adapted to engage said inclined surfaces and move the bolts longitudinally and a master-key having circumferential grooves adapted to hold the corresponding balls in position to maintain the bolts in the unlocked position.

5. A lock comprising in combination a rotary barrel having a central cylindrical key hole, spring-pressed bolts longitudinally sliding in grooves in the outer surface of the barrel and adapted to lock the barrel at either end, inclined surfaces on said bolts, balls sliding in radial slots extending between the grooves and the key-hole and adapted to engage said inclined surfaces and move the bolts longitudinally and a master key having circumferential grooves adapted to hold the corresponding balls in position to maintain the balls in the unlocked position.

6. A lock comprising a block or element secured to one of the parts to be locked and provided with a plurality of parallel holes including a key-hole, balls mounted in recesses connecting radially the parallel holes to the key hole, locking rods with conical ends engaging with the said balls, bolts carried by the said rods and passing through openings of the block, springs acting on the rods and tending to press them against the balls, plates carried by the other part to be closed and engaging with each side of the block, the said plates being provided with notches each having an inclined side adapted to be engaged by a bolt when the two parts to be locked are closed.

In testimony whereof I have signed my name to this specification in the presence of two subscribing witnesses.

CHARLES RENAUX.

Witnesses:
ELY E. PALMER,
GEORGES BONNEUIL.

Copies of this patent may be obtained for five cents each, by addressing the "Commissioner of Patents, Washington, D. C."